United States Patent
Cypher

(10) Patent No.: US 7,266,651 B1
(45) Date of Patent: Sep. 4, 2007

(54) METHOD FOR IN-PLACE MEMORY INTERLEAVING AND DE-INTERLEAVING

(75) Inventor: Robert E. Cypher, Saratoga, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 357 days.

(21) Appl. No.: 10/935,560

(22) Filed: Sep. 7, 2004

(51) Int. Cl.
*G06F 12/00* (2006.01)
*G06F 13/00* (2006.01)
*G06F 13/28* (2006.01)
*G06F 9/26* (2006.01)
*G06F 9/34* (2006.01)
*G06F 12/08* (2006.01)

(52) U.S. Cl. .................... 711/157; 711/127; 711/165; 711/202; 711/205; 711/206; 711/207; 711/220; 711/221; 711/3; 711/5; 365/230.03; 365/230.04

(58) Field of Classification Search .............. 711/3, 711/5, 127, 157, 165, 202, 205, 206, 207, 711/220, 221; 365/230.03, 230.04
See application file for complete search history.

(56) References Cited

U.S. PATENT DOCUMENTS

| | | | |
|---|---|---|---|
| 4,853,846 A | 8/1989 | Johnson et al. | |
| 5,606,650 A * | 2/1997 | Kelley et al. | 345/552 |
| 6,381,668 B1 | 4/2002 | Lunteren | |
| 6,473,845 B1 | 10/2002 | Hornung et al. | |
| 2003/0135670 A1* | 7/2003 | Anderson | 710/22 |
| 2005/0091466 A1* | 4/2005 | Larson et al. | 711/170 |

OTHER PUBLICATIONS

"Using Hardware Counters to Automatically Improve Memory Performance"; Mustafa M. Tikir & Jeffrey K. Hollingsworth; Computer Sciences Department, University of Maryland, College Park, MD; pp. 1-12.

* cited by examiner

*Primary Examiner*—Donald Sparks
*Assistant Examiner*—Prasith Thammavong
(74) *Attorney, Agent, or Firm*—Meyertons Hood Kivlin Kowert & Goetzel, P.C.; Stephen J. Curran

(57) ABSTRACT

A method for in-place interleaving and de-interleaving of a memory includes, in one embodiment, generating a new address corresponding to a new location in the memory by performing a bit-wise XOR operation on a number of bits of a first portion of a current address and a number of bits of a different portion of the current address. The current address corresponds to a current location in the memory. In addition, the method includes performing a data swap on data stored at the current location with data stored at the new location.

21 Claims, 4 Drawing Sheets

METHOD FOR IN-PLACE MEMORY INTERLEAVING AND DE-INTERLEAVING

BACKGROUND OF THE INVENTION

1. Field of the Invention

This invention relates to system memory configurations and, more particularly, to the interleaving and de-interleaving of memory.

2. Description of the Related Art

As computer system processors have reached higher performance levels, the need for faster memories has become more evident. However, gains in processor performance have far outpaced gains in memory device performance. Accordingly, various techniques have been employed in an attempt to improve the memory system performance.

For example, in many cases, memory access time may be critical to the satisfactory operation of a particular software application. Depending on the system configuration and size, a computer system may have one or more memory controllers that control multiple banks of memory. In some cases, the way the data is stored in memory may cause bottlenecks. For example, if a particular region or bank of memory is accessed heavily, it may create a bandwidth issue and increase latencies which contribute to degraded system performance.

One technique that is used to improve memory latencies and distribute bandwidth is known as interleaving. Interleaving refers to mapping consecutive cache line addresses to different banks, or in multi-memory controller systems, to different memory controllers. In some systems, each memory controller may include hardware that determines which addresses are mapped to the controller. Thus, the memory controller hardware can be configured to interleave accesses to consecutive cache line addresses.

It may sometimes be desirable to perform a reconfiguration of the memory system. As part of the reconfiguration, a de-interleave operation may sometimes be performed. During a de-interleave operation, the mapping hardware may be reconfigured. In conventional systems, de-interleaving can be a very complex function including multiple address shift cycles, some of which may include varying cycle lengths depending on whether the number of bits in the address is a prime number. For example, to go from an 8-way interleave to a non-interleaved state, it may take a 3-position cyclic shift to the left of the address to get to a first new mapping. Now, the new location already has data in it which needs to be moved to a new position, which causes another 3-position shift, and so on, until all the mappings have been changed and the memory system is in a de-interleaved state.

SUMMARY

Various embodiments of a method for in-place interleaving and de-interleaving of a memory are disclosed. In one embodiment, the method includes generating a new address corresponding to a new location in the memory by performing a bit-wise XOR operation on a number of bits of a first portion of a current address corresponding to a current location in the memory and a number of bits of a different portion of the current address. In addition, the method includes performing a data swap on data stored at the current location in the memory with data stored at the new location in the memory.

Figure 1:
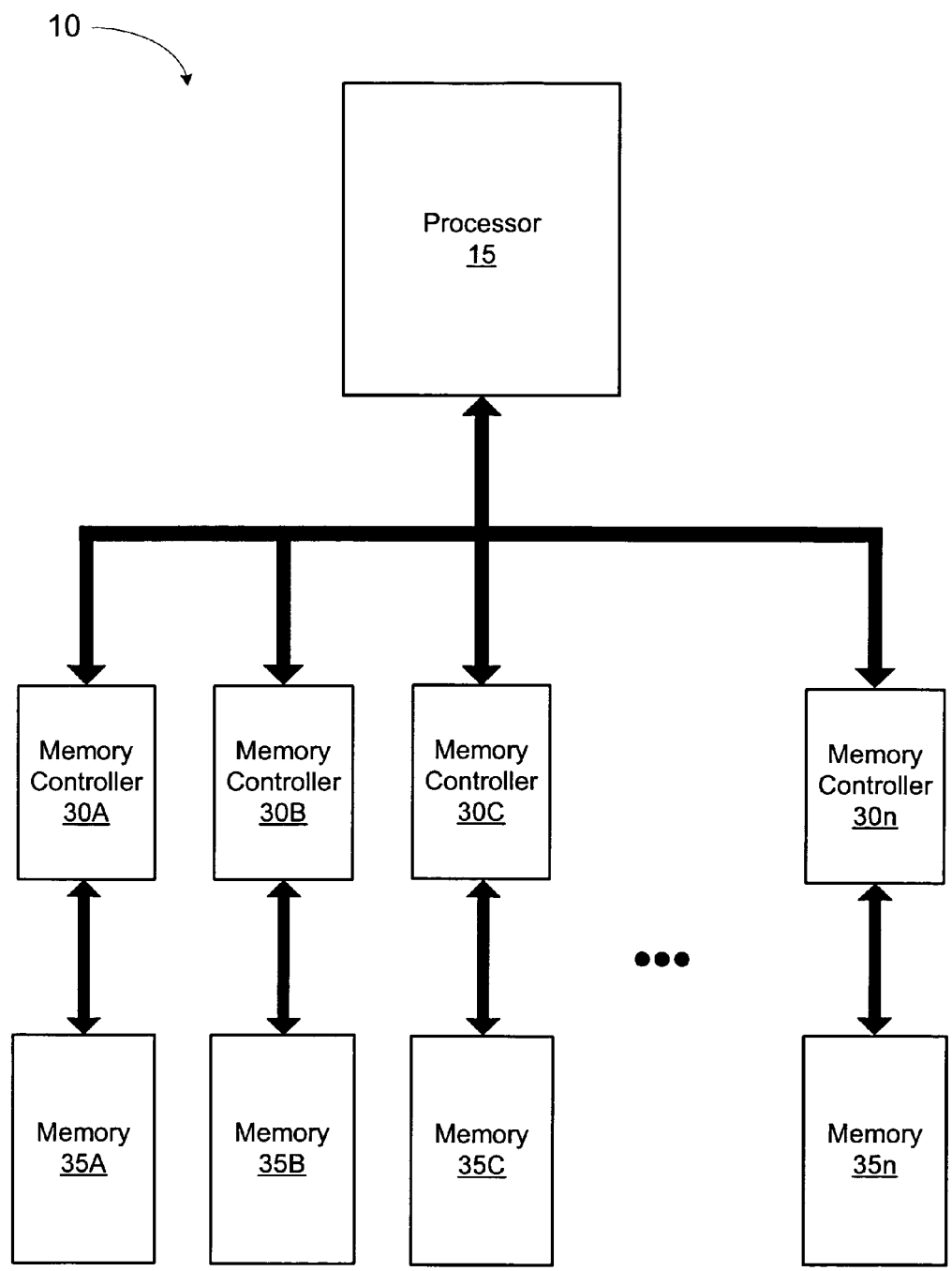
FIG. 1 is a block diagram of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include" and derivations thereof mean "including, but not limited to." The term "connected" means "directly or indirectly connected," and the term "coupled" means "directly or indirectly coupled."

DETAILED DESCRIPTION

Turning now to FIG. 1, a block diagram of one embodiment of a computer system is shown. Computer system 10 includes a processor 15 coupled to a plurality of memory controllers designated 30A through 30n. Further, each memory controller is coupled to a respective memory designated 35A through 35n. It is noted that n is used to illustrate that any number of memory controllers may be used. In one embodiment, the total number of memory controllers and their corresponding respective memories may be a power of two. It is further noted that in other embodiments, other numbers of processors 15 may be used, such as in a multi-processor system, for example.

In one embodiment, processor 15 may be illustrative of a processor in the UltraSparc™ family of processors, for example. However, in other embodiments, processor 15 may be illustrative of any type of processor. While processor 15 may execute program instructions for general purpose computing, it is contemplated that processor 15 may also execute program instructions that configure memory controllers 30A-30n. For example, as will be described further below, processor 15 may configure memory controllers 30A-30n using one or more configuration registers, to operate in either an interleaved mode or a de-interleaved (i.e., non-interleaved mode). It is noted that in other embodiments, an additional system or "service" processor (not shown) may be used for system monitoring and configuration purposes.

Memories 35A-35n may be any type of memory such as a memory implemented using devices in the dynamic random access memory (DRAM) family of devices. For example, in one embodiment, memories 35A-35n may be implemented using removable memory modules including one or more DRAM devices. In other embodiments, the DRAM devices may be mounted directly to a motherboard. The DRAM devices may also be configurable to operate in a banked arrangement. For example, a given memory such as memory 35A may be configured into one or more banks. It is noted that in one embodiment, the banks may be external banks that include one or more DRAM devices. In other embodiments, the banks may be internal to each DRAM device. In still other embodiments, the bank arrangement may be a combination of internal and external banks.

Each of memory controllers 30A-30n may control accesses to their respective memories using a programmable memory mapping function. For example, in response to a memory transaction request including a cache line address sent by processor 15, one of the memory controllers will match on the cache line address. Whether operating in the interleaved or de-interleaved mode, each memory controller may map a substantially equal portion of the total address space allocated to memories 35A-35n. As will be described in greater detail below, if cache line addresses are 40-bit addresses, a bit-wise Exclusive-OR (XOR) operation performed on bits 39:37 and bits 2:0 may be used to identify the memory controller and bits 36:0 may be used to map the position in the memory controller, which corresponds to the physical location in that memory controller's respective memory. In one embodiment, a cache line may include 64 bytes. In such an embodiment, a cache line address may correspond to 64 consecutive bytes of data. It is noted that in other embodiments, other numbers of bytes of data may correspond to a single cache line address.

The decoding or "mapping" function may include programmable hardware that determines which addresses are mapped to which physical memory. However, it is noted that a programmable memory mapping function may be implemented in a number of ways, as desired. For example, the memory mapping function may include programmable decode logic, such as registers, that are configured to match on certain bits of a cache line address associated with an incoming memory request. The registers may determine which bits to use in the cache line address and what the value of those bits will be for a match.

When operating in a de-interleaved mode, each of memory controllers 30A-30n may be configured such that consecutive cache line addresses may be mapped by the same memory controller. For example, in a system having eight memory controllers, if each memory controller maps one eighth of the total address space allocated to memories 35A-35n, then memory controller 35A maps the first eighth, memory controller 35B maps the second eighth, and so on. Thus, each memory controller may map consecutive cache line addresses within the range of addresses allocated to its corresponding respective memory.

In addition, memory controllers 30A-30n may be configured to operate in an interleaved mode. As such, consecutive cache line addresses are typically not mapped by the same memory controller. In systems that include a single memory controller, the interleaving may be applied at the bank level such that consecutive cache line addresses do not map to the same bank. In the illustrated embodiment, a given cache line address may be mapped to memory 35A by memory controller 30A. However, the next consecutive cache line address may be mapped to memory 35B by memory controller 30B. To illustrate, in a system having eight memory controllers, nine consecutive cache line addresses may be mapped by the memory controllers as follows: The first eight cache line addresses may map to memories 30A, 30B, 30C, . . . 30n and the ninth maps back to 30A.

For various reasons (e.g., adding or removing memory/memory controllers, optimizing memory interleaving), it may desirable to reconfigure memory controllers 30A-30n during operation of computer system 10. Reconfiguration of the memory system during operation is sometimes referred to as dynamic reconfiguration (DR). During a DR, the memory system may be switched from operating in an interleaved mode to a de-interleaved mode or vice versa. When no memory controllers or memory is being added or deleted from the system, switching between the interleaved and de-interleaved modes may be referred to as "in-place" interleaving and de-interleaving. In addition to the functionality described above, the memory system may include interleave/de-interleave functionality that may include logic and processing circuits (not shown) within memory controllers 30A-30n configured to perform tasks associated with a DR of the memory.

In one embodiment, when performing an in-place interleave or de-interleave, the mappings in one or more of memory controllers 30A-30n may be changed and the data stored in the corresponding physical locations of memories 35A-35n may be moved. In conventional systems, this may create a complex cycle of creating new mappings and moving the corresponding data. However, using the result of the bit-wise XOR operation described above to map or identify the memory controller may simplify the reconfiguration process.

Figure 2:
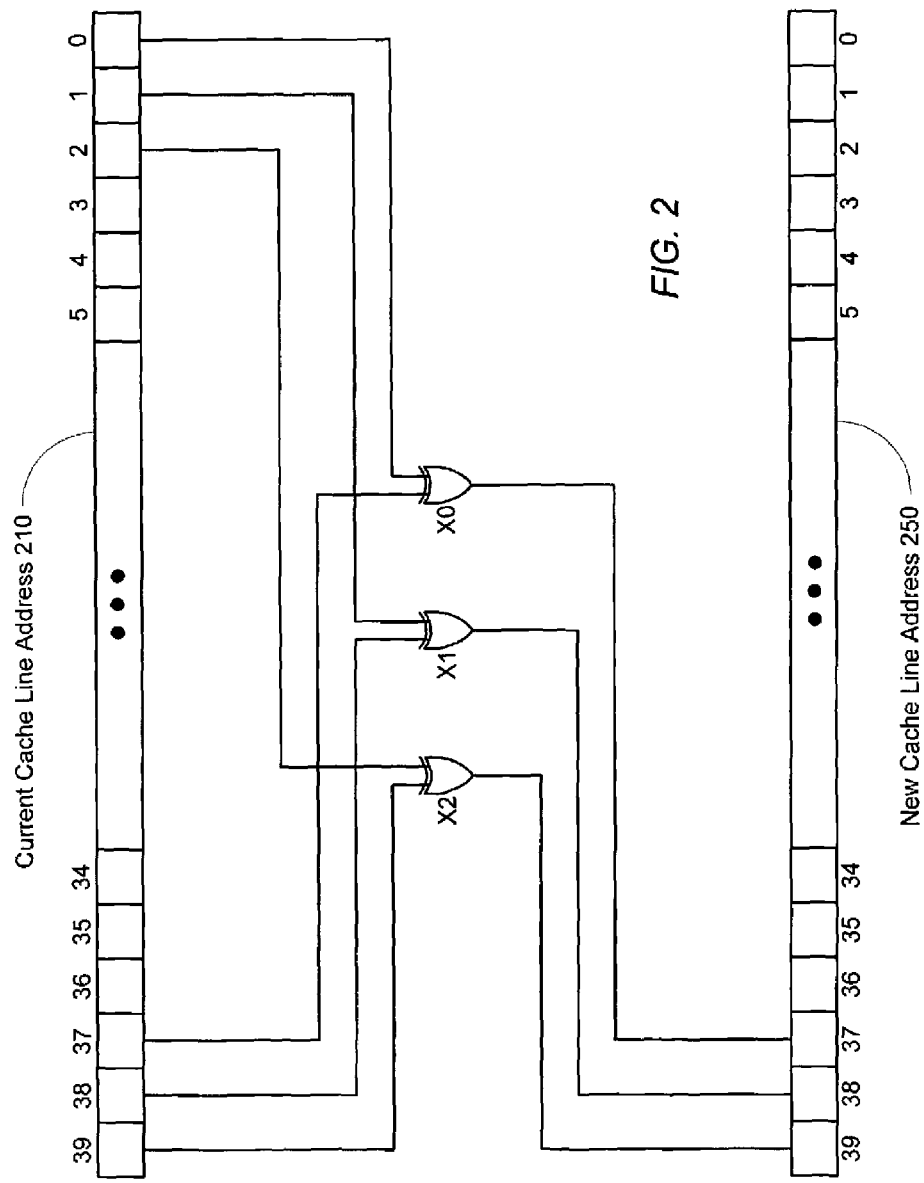
FIG. 2 is a diagram illustrating the generation of a new address using a bit-wise XOR operation, in one embodiment.

FIG. 2 illustrates one embodiment of the generation of a new address using a bit-wise XOR operation. Current cache line address 210 and new cache line address 250 each include 40 bits. Bits 39, 38, and 37 are combined in a bit-wise XOR with bits 2, 1, and 0 of current cache line address 210 to form new cache line address 250. In the illustrated embodiment, the result of the bit-wise XOR operation forms bits 39, 38, and 37 of new cache line address 250. In one embodiment, bits 39, 38, and 37 of new cache line address 250 may be used by memory controllers 30A-30n to determine if a cache line address is a match, while the remaining bits (e.g., 36:0) may be used to identify or map the cache line address to the physical location in memory. The bit-wise XOR operation is shown as three 2-input XOR gates designated X0, X1 and X2. However, in other specific implementations, the XOR functionality may be different, as desired.

It is noted that the illustrated embodiment is a specific implementation of computer system 10 in which computer system 10 uses a 40-bit address and in which eight memory controllers are interleaved eight ways. It is contemplated that in other embodiments, other numbers of address bits and other numbers of memory controllers may be used. Furthermore, the memory controllers may be interleaved differently. In such embodiments, the specific bits that are combined using the XOR function may be different.

To simplify interleaving and de-interleaving, the interleave/de-interleave functionality shown in FIG. 2 may be used by processor 15 (or a suitable service processor, not shown), by hardware within each memory controller or a suitable combination. For example, when switching from an interleaved mode to de-interleaved mode, for each current interleaved address in a memory controller map, a de-interleaved address may be created from an interleaved address using this XOR operation. The data may be swapped between the current address and new address. The process may be repeated until all addresses in a memory controller have been re-mapped. Similarly, when switching from de-interleaved mode to an interleaved mode, for each current de-interleaved address in a memory controller map, an interleaved address may be created using this operation. The data may be swapped between the locations corresponding to the current address and the new address. The descriptions of FIG. 3 and FIG. 4, below, describe in-place de-interleave and in-place interleave operations, respectively of one embodiment of the computer system of FIG. 1.

Figure 3:
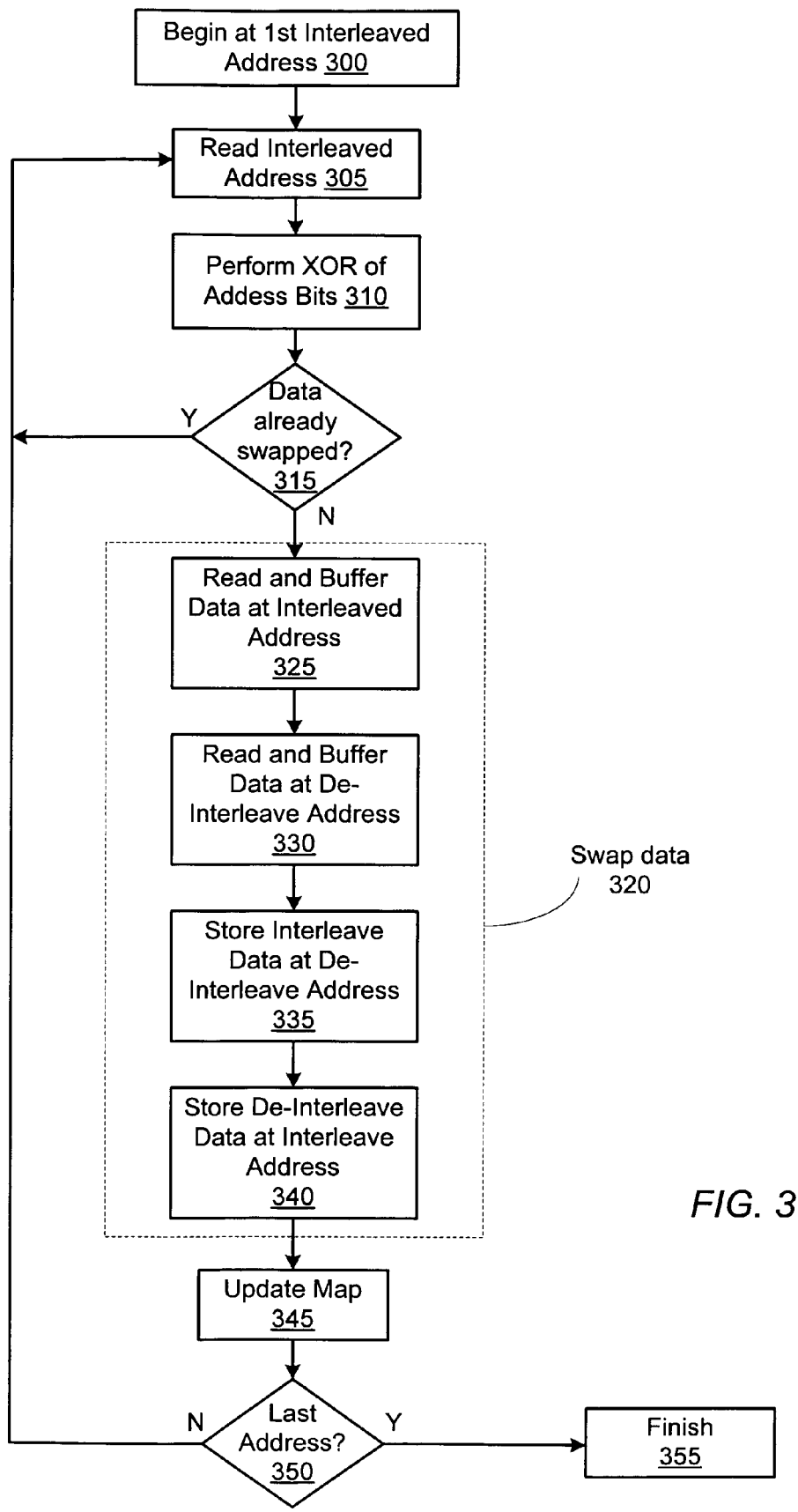
FIG. 3 is a flow diagram describing one embodiment of an in-place de-interleave operation of the computer system of FIG. 1.

Referring collectively to FIG. 1 through FIG. 3, an in-place de-interleave operation is described. Beginning in block 300, in one embodiment, processor 15 may initiate a DR, causing configuration hardware within a first memory controller such as memory controller 30A, for example to access the memory map information. Configuration hardware may read the first (next) interleaved cache line address (referred to as the current address) mapped by memory controller 30A (block 305). Configuration hardware may then generate a de-interleaved address (referred to as a new address) by performing a bit-wise XOR operation as described above. Configuration hardware may determine if the data at this address has already been swapped (block 315). For example, in one embodiment, each time a de-interleaved address is calculated, if the de-interleaved address is larger than the interleaved address, configuration hardware may swap the data located at the physical locations in memory which correspond to the interleaved and de-interleaved addresses (block 320). If, on the other hand, the interleaved address is larger than the de-interleaved address, configuration hardware may get the next address as described above in block 305. It is noted that the de-interleaved (new) address just generated is a current interleaved address for either memory controller 30A or one of the other memory controllers and thus may have data associated with it. Accordingly, it is possible that the data associated with the new de-interleaved address may be located in any of the memories including memory 30A. It is also noted that in other embodiments the swap may be performed only when the interleaved address is larger than the de-interleaved address.

In one embodiment, when swapping the data (block 320), configuration hardware may read and buffer the data from the memory location corresponding to the current interleaved address (block 325). Configuration hardware may also read and buffer the data from the memory location corresponding to the new de-interleaved address (block 330). Configuration hardware may store the data from the memory location corresponding to the current interleaved address at the memory location corresponding to the new de-interleaved address (block 335). Further, configuration hardware may store the data from the memory location corresponding to the new de-interleaved address at the memory location corresponding to the current interleaved address (block 340). In addition, the memory map within memory controller 30A may be updated to reflect the new de-interleaved address (block 345). It is noted that the reading, buffering and storing steps are described here for illustrative purposes. It is contemplated that any method for swapping the data may be employed as desired.

If this is the last address (block 350), the de-interleaving aspect of the dynamic reconfiguration is complete. The memory controller(s) have been remapped to a de-interleaved state, the associated data has been moved and the memory system may be operated in the de-interleaved mode (block 355). However, if this is not the last address in the map (block 350), configuration hardware reads the next cache line address in the map as discussed above in block 305.

Figure 4:
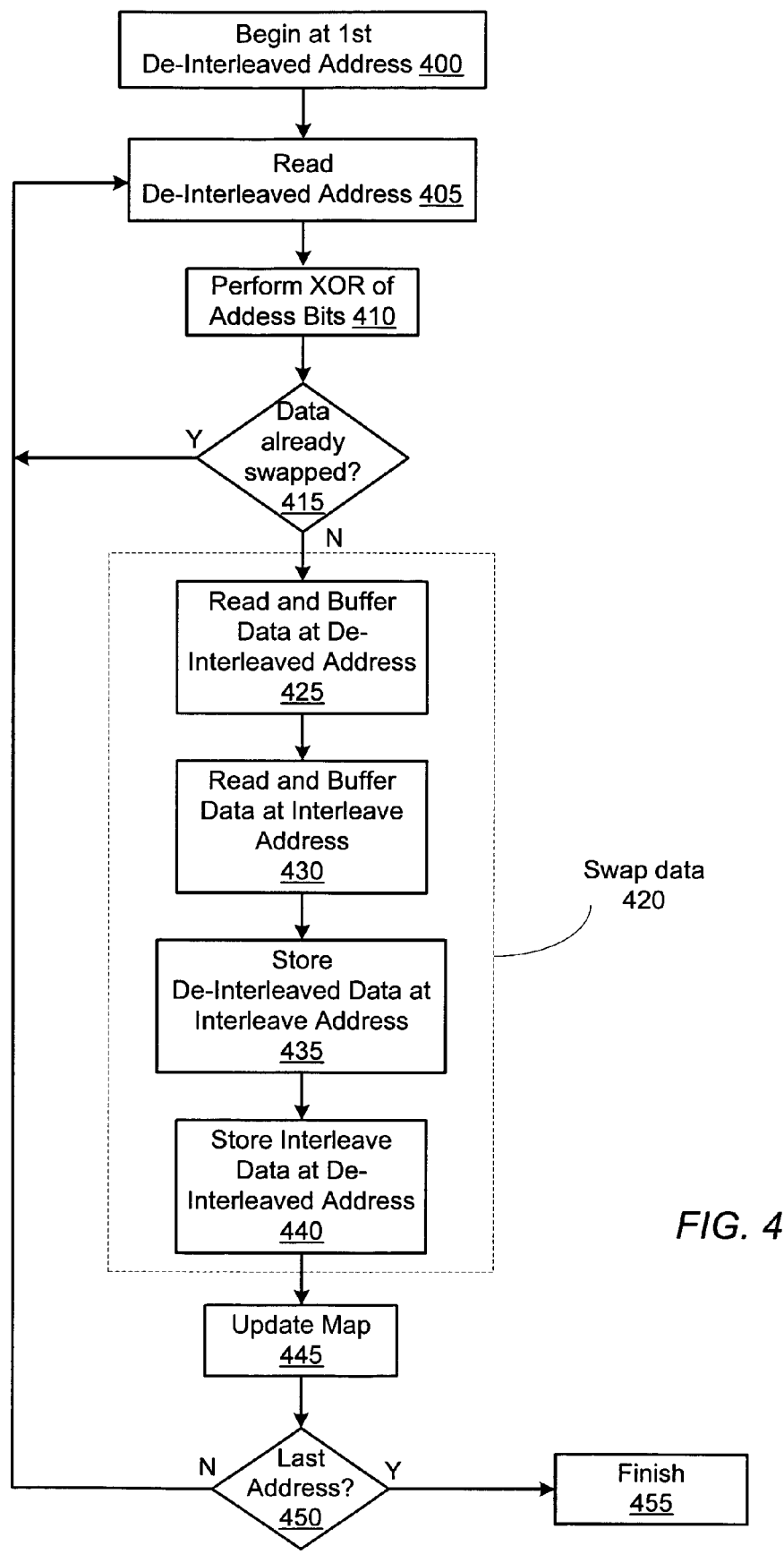
FIG. 4 is a flow diagram describing one embodiment of an in-place interleave operation of the computer system of FIG. 1.

As noted above, FIG. 4 describes an in-place interleave operation of a dynamic reconfiguration. The in-place interleave operation is similar to the de-interleave operation described above in conjunction with FIG. 3. However, as illustrated in FIG. 4, beginning in block 400 in one embodiment, the memory system is in the de-interleaved state and processor 15 may initiate a DR and configuration hardware reads the first (next) de-interleaved cache line address (referred to as the current address) mapped by memory controller 30A (block 405). The bit-wise XOR operation is performed on the current address to generate a new interleaved address (block 410). As described above in conjunction with FIG. 3, configuration hardware may determine if the data at this address has already been swapped (block 415). If the data has not already been swapped, configuration hardware may swap the data located at the physical locations in memory which correspond to the interleaved and de-interleaved addresses (block 420). If the data has already been swapped, configuration hardware may get the next address as described above in block 405. The data located at the physical locations in memory which correspond to the de-interleaved and interleaved addresses is swapped (block 420) as shown in greater detail in blocks 425 through 440. The reading, buffering and storing steps included in the data swapping are similar to those steps described in detail above in conjunction with FIG. 3, and are thus not repeated here for brevity.

If this is the last address (block 450), the interleaving aspect of the dynamic reconfiguration is complete. Thus, the memory controller(s) have been remapped, the associated data has been moved and the memory system is now in the interleaved state and may be operated in the interleaved mode (block 455). However, if this is not the last address in the map, configuration hardware reads the next cache line address in the map as discussed above in block 405.

It is noted that although the interleave/de-interleave functionality and other tasks associated with a DR are described above as being performed by configuration hardware within the memory controllers 30A-30n, in other embodiments, the interleave/de-interleave functionality and other tasks associated with a DR may be initiated and performed by any combination of components in computer system 10. In addition, in lieu of processor 15, as mentioned above, a service processor may be configured to perform some or all of the tasks associated with a dynamic reconfiguration.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method of interleaving and de-interleaving a memory, said method comprising:
generating a new address corresponding to a new location in the memory by performing a bit-wise XOR operation on a number of bits of a first portion of a current address and a number of bits of a different portion of the current address, wherein the current address corresponds to a current location in the memory; and
performing a data swap on data stored at the current location in the memory with data stored at the new location in the memory.

2. The method as recited in claim 1 further comprising updating one or more memory maps by mapping the new address to the current location in the memory and the current address to the new location in the memory.

3. The method as recited in claim 1, wherein the current address is a cache line address corresponding to one cache line of data.

4. The method as recited in claim 3, wherein a cache line of data corresponds to 64 bytes of data.

5. The method as recited in claim 3, wherein the first portion of the current address is the least significant cache line address bits.

6. The method as recited in claim 3, wherein the different portion of the current address is the most significant cache line address bits.

7. The method as recited in claim 1, wherein the current address corresponds to an interleaved address.

8. The method as recited in claim 1, wherein the current address corresponds to a de-interleaved address.

9. The method as recited in claim 1 further comprising iteratively generating a new address for each current address associated with a memory controller until all current addresses have been read.

10. A computer system comprising:
  a processor;
  a memory controller coupled between the processor and a memory and configured to access a physical location within the memory that is associated with a current address using a map;
  wherein, for each address in the map, the memory controller is configured to generate a new address corresponding to a new location in the memory by performing a bit-wise XOR operation on a number of bits of a first portion of a current address and a same number of bits of a different portion of the current address, wherein the current address corresponds to a current location in the memory; and
  wherein, for at least a portion of the new addresses, the memory controller is further configured to cause a data swap to be performed on data stored at the current location in the memory with data stored at the new location in the memory.

11. The computer system as recited in claim 10, wherein the memory controller is further configured to update the map by mapping the new address to the current location in the memory and the current address to the new location in the memory.

12. The computer system as recited in claim 10, wherein the current address is a cache line address corresponding to one cache line of data.

13. The computer system as recited in claim 12, wherein a cache line of data corresponds to 64 bytes of data.

14. The computer system as recited in claim 12, wherein the first portion of the current address is the least significant cache line address bits.

15. The computer system as recited in claim 12, wherein the different portion of the current address is the most significant cache line address bits.

16. The computer system as recited in claim 10, wherein the current address corresponds to an interleaved address.

17. The computer system as recited in claim 10, wherein the current address corresponds to a de-interleaved address.

18. The computer system as recited in claim 10 further comprising iteratively generating a new address for each current address associated with a memory controller until all current addresses have been read.

19. A computer system comprising:
  means for generating a new address corresponding to a new location in the memory by performing a bit-wise XOR operation on a number of bits of a first portion of a current address and a number of bits of a different portion of the current address, wherein the current address corresponds to a current location in the memory; and
  means for performing a data swap on data stored at the current location in the memory with data stored at the new location in the memory.

20. The computer system as recited in claim 19 further comprising means for updating one or more memory maps by mapping the new address to the current location in the memory and the current address to the new location in the memory.

21. A memory system comprising:
  a memory;
  a memory controller coupled to the memory and configured to access a physical location within the memory that is associated with a current address using a map;
  interleave/de-interleave functionality configured to, for each address in the map, generate a new address corresponding to a new location in the memory by performing a bit-wise XOR operation on a number of bits of a first portion of a current address and a same number of bits of a different portion of the current address, wherein the current address corresponds to a current location in the memory; and
  wherein, for at least a portion of the new addresses, the interleave/de-interleave functionality is further configured to cause a data swap to be performed on data stored at the current location in the memory with data stored at the new location in the memory.

* * * * *